United States Patent [19]

Sato

[11] Patent Number: 5,188,312
[45] Date of Patent: Feb. 23, 1993

[54] FISHING REEL WITH REAR POSITIONED THUMB REST AND CLUTCH CONTROL MEMBER

[75] Inventor: Jun Sato, Sakai, Japan

[73] Assignee: Shimano, Inc., Osaka, Japan

[21] Appl. No.: 908,601

[22] Filed: Jun. 30, 1992

Related U.S. Application Data

[63] Continuation of Ser. No. 596,046, Oct. 11, 1990.

[30] Foreign Application Priority Data

Oct. 13, 1989 [JP] Japan .................. 1-266868

[51] Int. Cl.⁵ .............................. A01K 89/02
[52] U.S. Cl. ..................... 242/261; 242/310
[58] Field of Search .......... 242/261, 262, 260, 259, 242/310

[56] References Cited

U.S. PATENT DOCUMENTS

| | | | |
|---|---|---|---|
| 4,223,854 | 9/1980 | Karlsson | 242/249 X |
| 4,406,427 | 9/1983 | Murakami | 242/261 |
| 4,512,536 | 4/1985 | Sato | 242/310 |
| 4,564,158 | 1/1986 | Moosberg et al. | 242/261 |
| 4,575,024 | 5/1984 | Kaneko | 242/310 X |
| 4,579,296 | 4/1986 | Karlsson et al. | 242/261 |
| 4,593,869 | 7/1986 | Yasui et al. | 242/261 |
| 4,634,079 | 1/1987 | Furomoto | 242/249 |
| 4,648,566 | 3/1987 | Furomoto | 242/259 X |
| 4,666,101 | 5/1987 | Atobe | 242/310 |
| 4,798,355 | 1/1989 | Kaneko | 242/261 |
| 4,819,893 | 4/1989 | Ueno | 242/310 X |
| 4,821,978 | 4/1989 | Kaneko | 242/310 |

*Primary Examiner*—Daniel P. Stodola
*Assistant Examiner*—Tony A. Gayoso
*Attorney, Agent, or Firm*—Dickstein, Shapiro & Morin

[57] ABSTRACT

A fishing reel is formed of a reel body, a spool supported at opposite end portions thereof by the reel body, a thumb rest element fixed to the reel body, and a clutch for selectively setting the spool to a free rotation condition. The clutch includes a control member, and the free rotation condition of the spool is achieved by moving the control member downwardly to a lower operational position. The thumb rest and control member are positioned rearwardly of the reel body, and the control member is structured to have an upper face thereof which is lower than an upper face of the thumb rest element when the control member is in its lower operational position.

5 Claims, 8 Drawing Sheets

FISHING REEL WITH REAR POSITIONED THUMB REST AND CLUTCH CONTROL MEMBER

This application is a continuation of application Ser. No. 07/596,046 filed Oct. 11, 1990, now abandoned.

BACKGROUND OF THE INVENTION

1. Field of the Invention:

The present invention relates to a fishing reel comprising a reel body, a spool supported at opposite end portions thereof by the reel body, a thumb rest element fixed to the reel body, and a clutch for selectively setting the spool to a free rotation condition.

2. Description of the Prior Art:

Examples of the above-noted conventional fishing reels are proposed in U.S. Pat. No. 4,475,024 and U.S. Pat. No. 4,819,893. The former discloses a clutch control member positioned rearwardly of a spool but does not disclose a thumb rest. The latter discloses a control member mounted on a transverse frame positioned rearwardly of a spool. In both patents, the spool is set to a free rotation condition by moving the control member downwardly.

When casting a fishing line from such a fishing reel, the fisherman presses the control member downwardly by the thumb of his or her right hand and swings a rod to unwind the fishing line from the spool. To prevent the fishing line from being drawn out excessively, inertial rotation of the spool is slowed by lightly placing the right thumb on an outer periphery of the spool (or the fishing line wound around the spool). This is called thumbing. In the fishing reels disclosed in the above-identified patents, during thumbing, to fix the thumb in place, the right thumb is placed on an upper face of the control member.

However, this control member is not positionally stabilized. There are gaps (or play) within a link mechanism connected to the control member, or pivotal support portions, which allow for movement of the control member. It is difficult to achieve delicate thumbing with the thumb resting against such a movable control member. In addition, in the prior art, the upper position of the control member is too high.

Another prior art fishing reel has a thumb rest positioned rearwardly of the spool, and a control member provided on a lateral plate or the like, separately from the thumb rest. With this structure, the thumb rest allows for delicate movement of the thumb during a baitcasting operation. However, in this reel, it takes too much time to begin the thumbing operation after completion of the control member operation.

SUMMARY OF THE INVENTION

An object of the present invention is to provide an improved fishing reel in which thumbing can be started with a minimal time lag after setting the spool to a free rotation condition, in which delicate movement of the tip of the thumb can be stabilized, and in which the control member is easy to handle.

In order to achieve the above object, a fishing reel according to the present invention has a thumb rest element and a control member, both of which are positioned rearwardly of a reel body, and with the control member having an upper face positioned lower than an upper face of the thumb rest element when the control member is located at its lower operational position.

With the characteristic features of the invention, as shown in FIGS. 1 to 5, the spool 2 is set in the free rotation condition by moving the control member 6 downwardly until its upper face 6s is lower than an upper face 3s of the thumb rest element 3. The thumb of the right hand can then be shifted from the control member 6 to the thumb rest 3 without being obstructed by the control member 6. More particularly, in the present structure, the control member 6 is located in the vicinity of the thumb rest element 3 and is moved downwardly to set the spool 2 to the free rotation condition. As a result, when pressing the control member downwardly, the thumb naturally contacts the upper face 3s of the thumb rest element 3.

Furthermore, when the spool 2 is set to the free rotation condition, the upper face 6s of the control member 6 is lower than the upper face 3s of the thumb rest element 3, which allows the thumb to be stabilized on the thumb rest element 3 (which is fixed to the reel body) for thumbing without obstruction by the control member 6. Owing to the relationship between these upper faces in the spool free rotation condition, the upper face 6s of the control member is not remote from the upper face 3s of the thumb rest element when the control member 6 is in its upper stationary position, which facilitates the operation of the control member.

Therefore, a convenient fishing reel is provided in which thumbing can be started with a minimal time lag after setting the spool to the free rotation condition, in which delicate movement of the tip of the thumb can be stabilized, and in which the control member is easy to handle.

Figure 1:
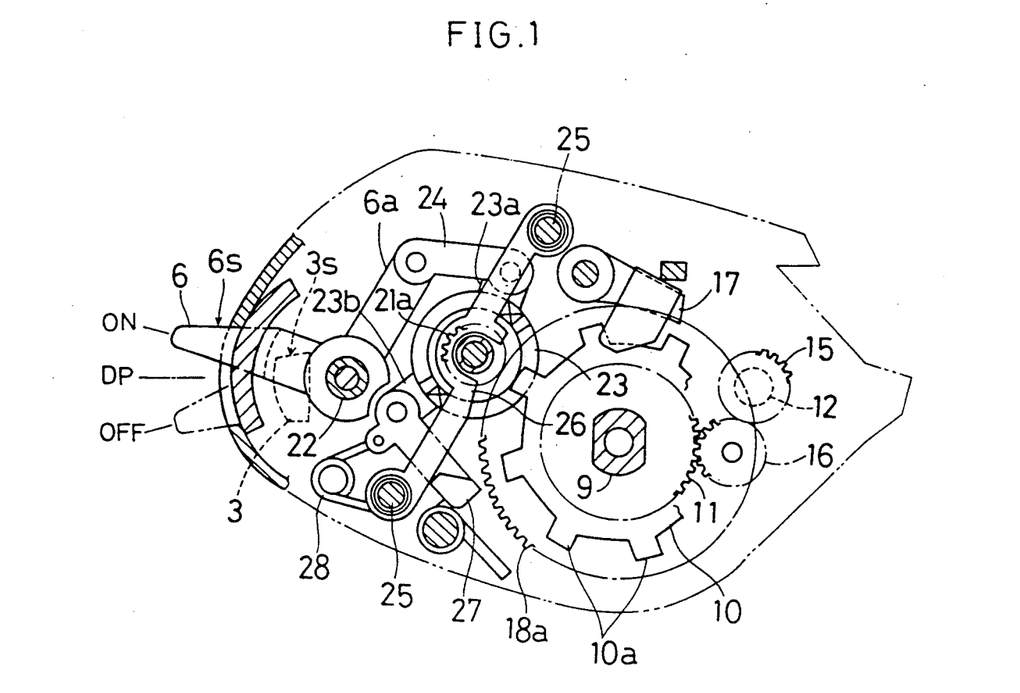
FIG. 1 is a vertical section of a fishing reel with a clutch in an engaged position.
Figure 2:
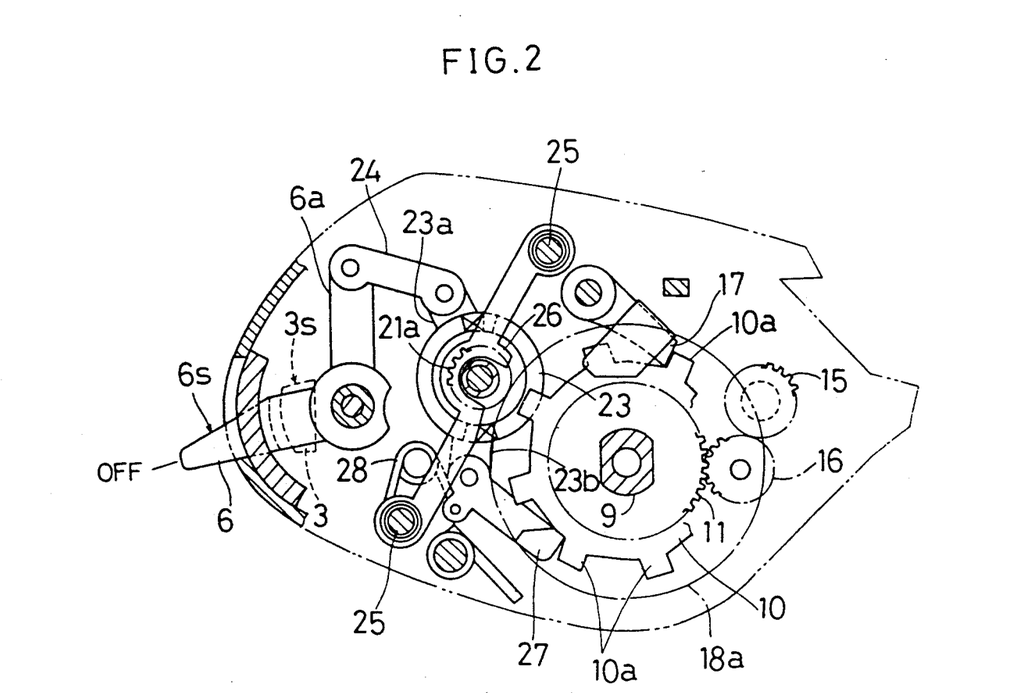
FIG. 2 is a vertical section of the reel with the clutch in a disengaged position.
Figure 3:
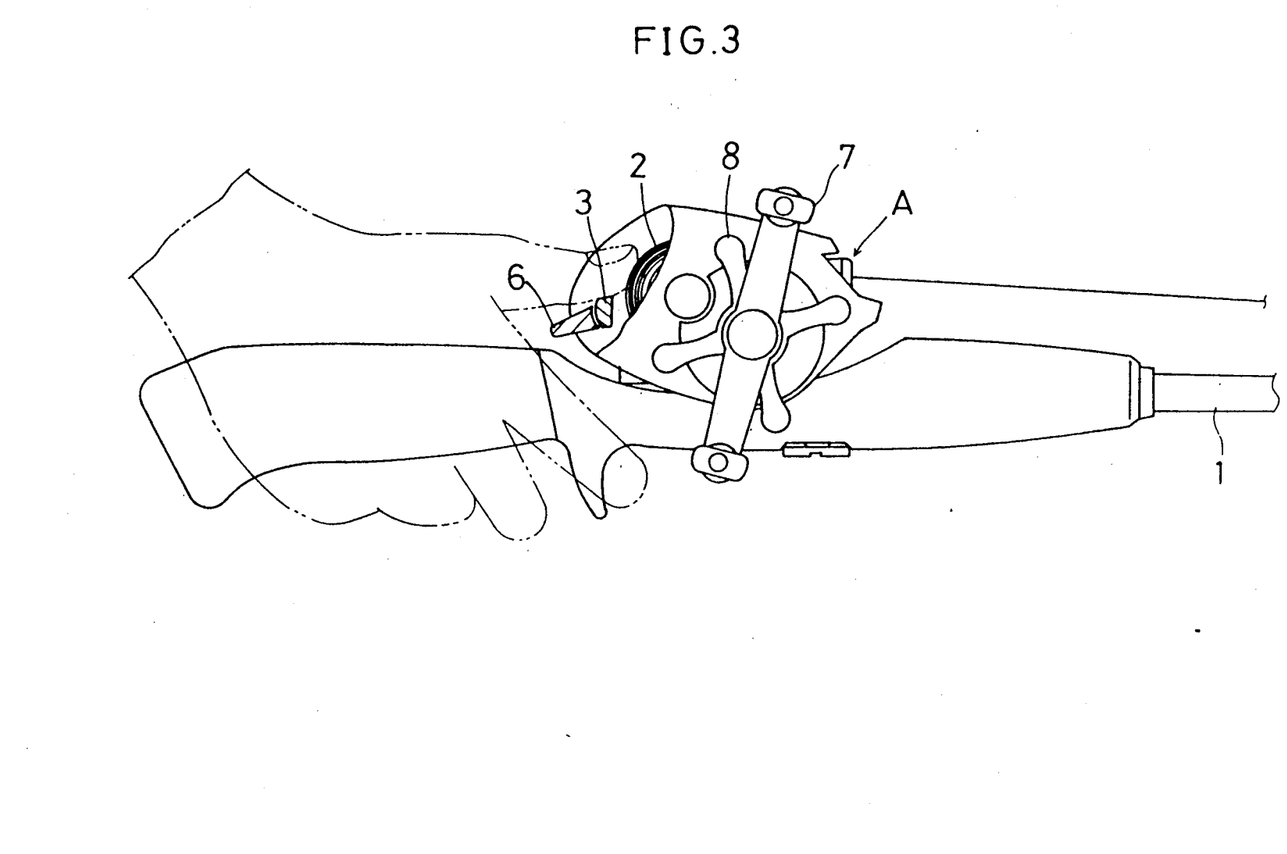
FIG. 3 is a partially broken away side view of the reel.

In operation, the upper face 6s of the control member 6 may be advantageously positioned rearwardly of the upper face 3s of the thumb rest element 3, as shown in FIG. 2. This way, the control member 6 can be readily operated by a middle portion of the thumb, and the thumb rest element 3 can receive the thumb in a position closer to the spool to reliably effect thumbing.

Other objects, features and advantages of the present invention will be apparent from the following description referring to the accompanying drawings.

BRIEF DESCRIPTION OF THE DRAWINGS

The drawings show fishing reels embodying the present invention. Throughout the drawings, like reference numerals and characters designate like elements.

FIGS. 1 to 5 illustrate a first embodiment in which:

FIGS. 6 to 9 illustrate a second embodiment in which:

FIGS. 10 to 13 illustrate a third embodiment in which:

DESCRIPTION OF THE PREFERRED EMBODIMENTS

A first embodiment of the present invention will be described below referring to FIGS. 1 through 5.

As seen from the drawings, a fishing reel for use with a rod 1 comprises a level wind mechanism A disposed in a front portion, a spool 2 in a middle portion, and a thumb rest 3 in a rear portion, all held between right and left side members 4 and 5. A pressing knob 6 (acting as a control member) is disposed further rearwardly of the thumb rest 3. The control knob 6 is pushed downwardly to set the spool 2 to a free rotation condition. A winding-up handle 7 and a star-like drag adjuster 8 are disposed outwardly of the right side member 5.

Figure 4:
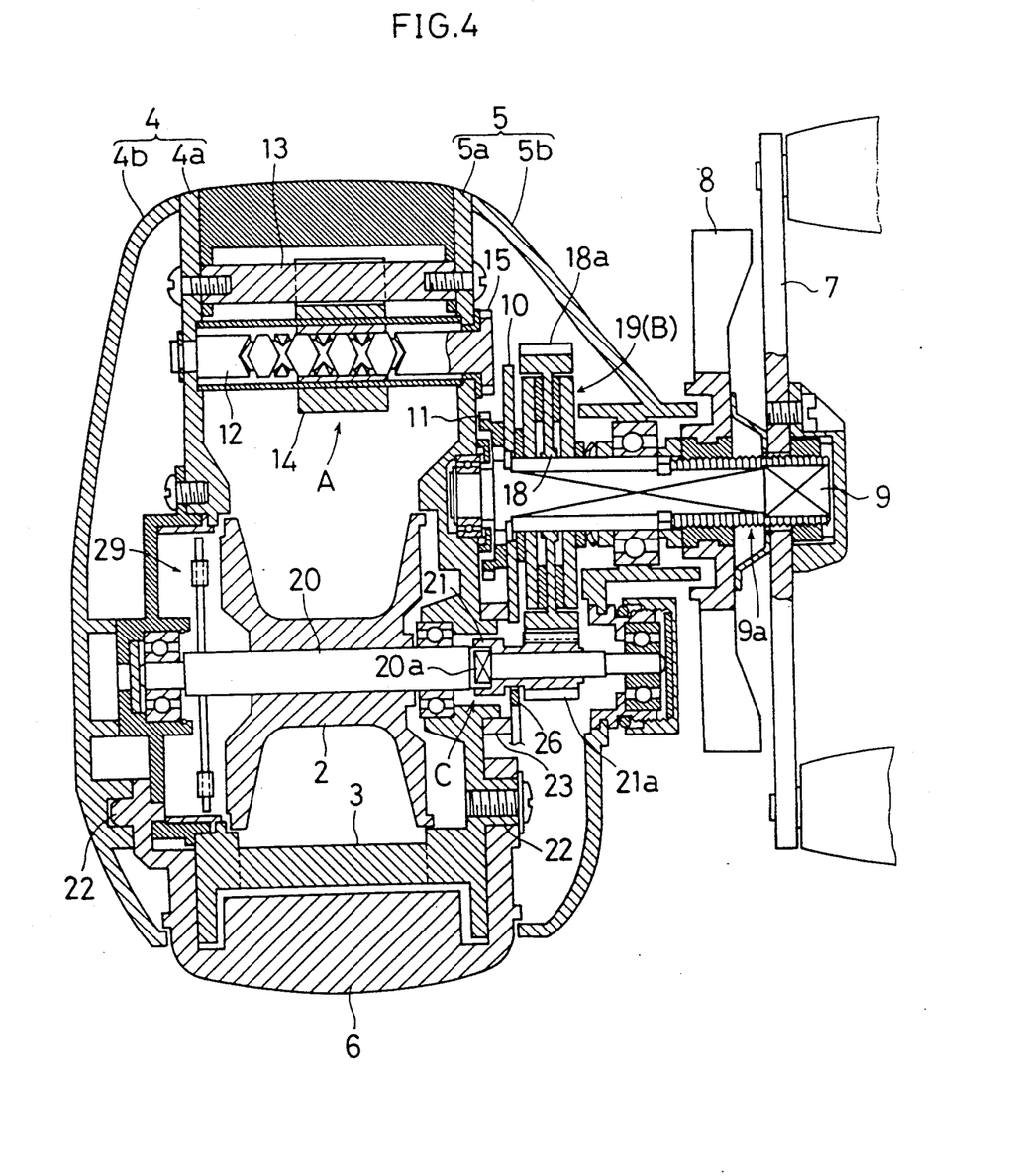
FIG. 4 is a cross-sectional plan view of the reel with the clutch in the engaged position.
Figure 5:
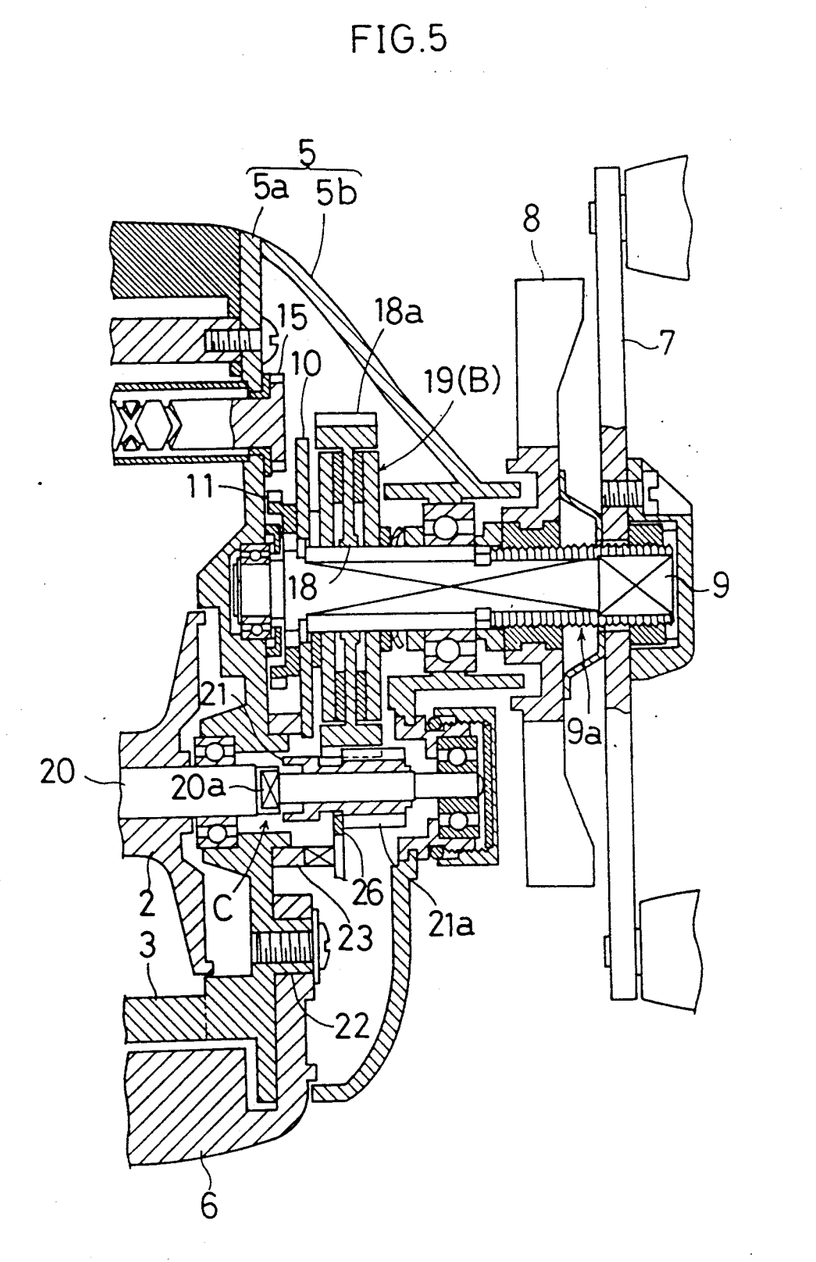
FIG. 5 is a fragmentary section of the reel with the clutch in the disengaged position.
Figure 6:
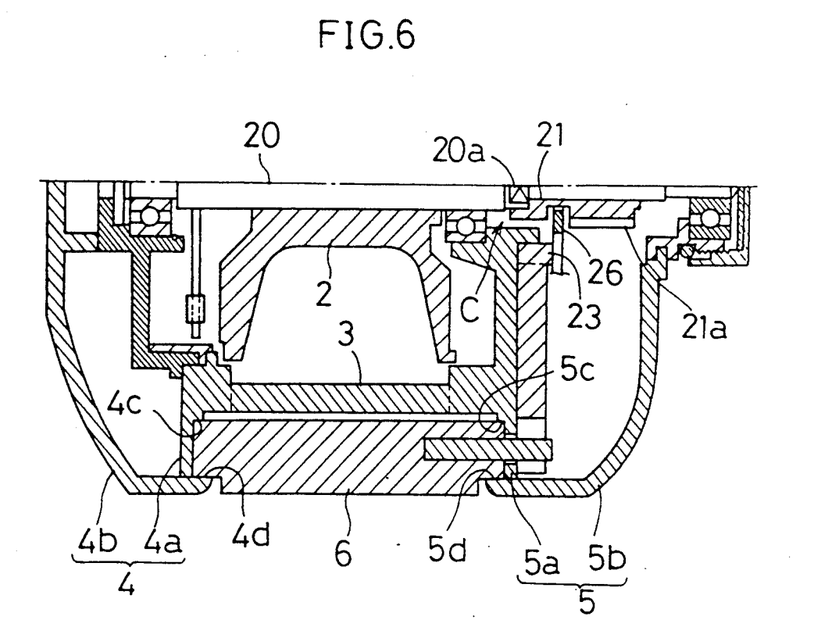
FIG. 6 is a fragmentary, cross-sectional plan view of a fishing reel.
Figure 7:
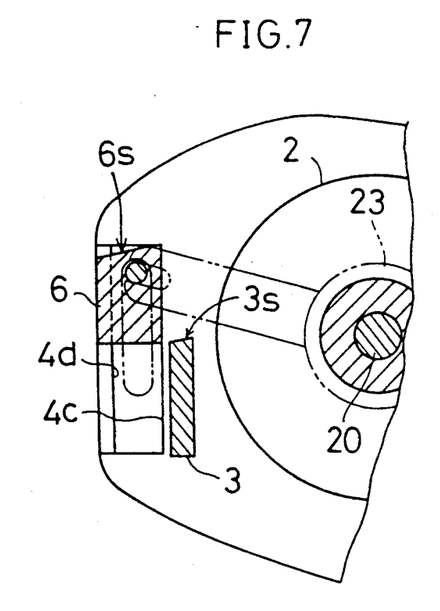
FIG. 7 is a fragmentary, cross-sectional side view of the reel with the clutch in an engaged position.
Figure 8:
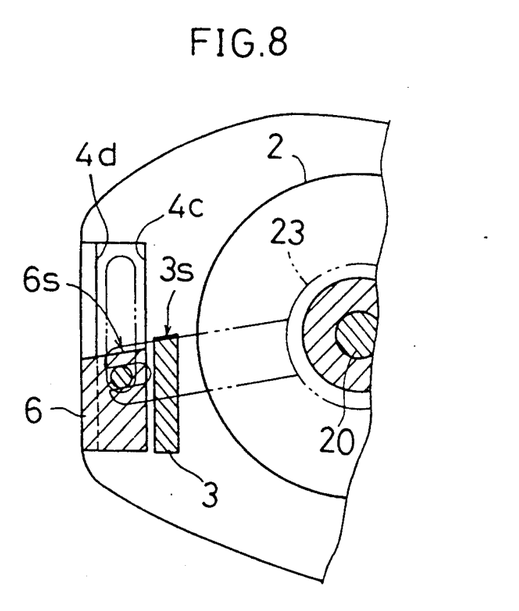
FIG. 8 is a fragmentary, cross-sectional side view of the reel with the clutch in the disengaged position.
Figure 9:
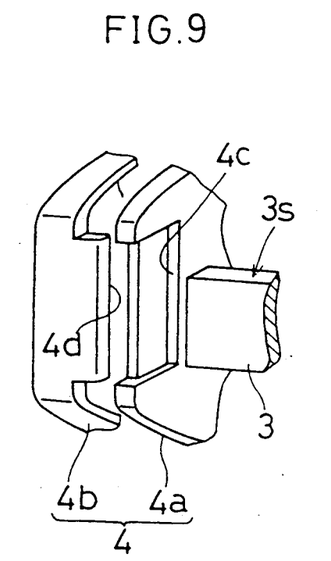
FIG. 9 is a fragmentary perspective view of the reel.
Figure 10:
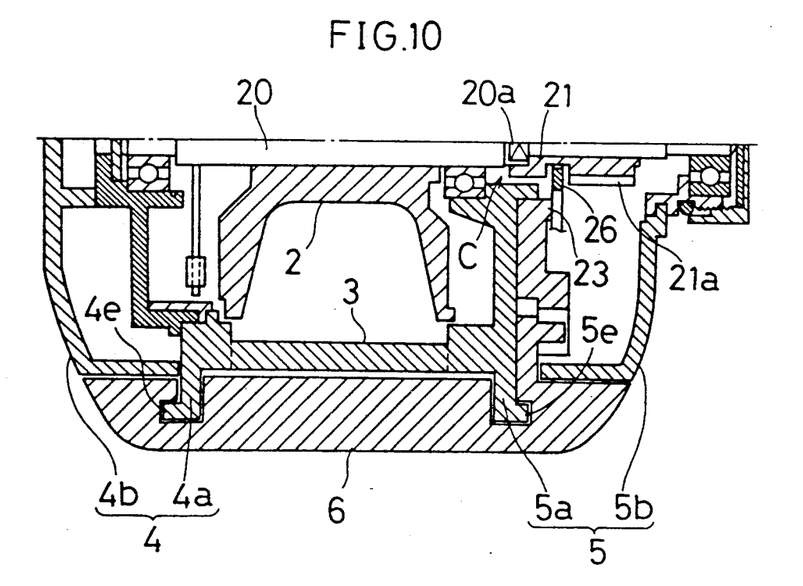
FIG. 10 is a fragmentary, cross-sectional plan view of a fishing reel.
Figure 11:
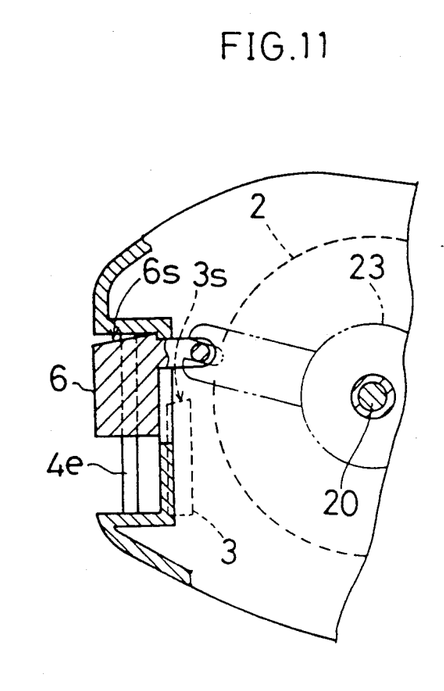
FIG. 11 is a fragmentary, cross-sectional side view of the reel with the clutch in the engaged position.
Figure 12:
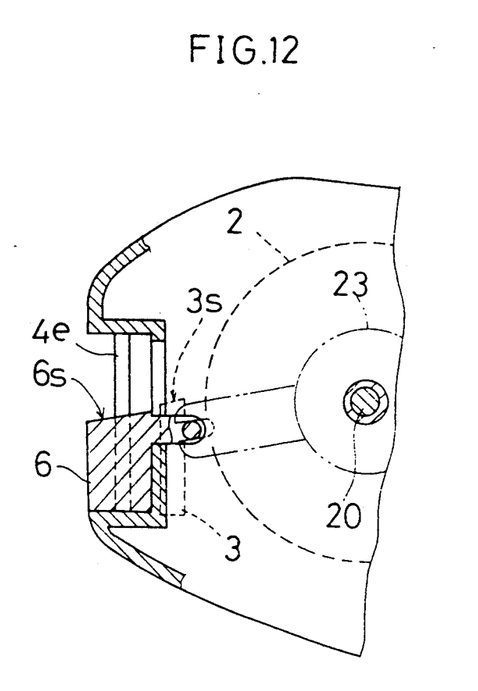
FIG. 12 is a fragmentary, cross-sectional side view of the reel with the clutch in the disengaged position.
Figure 13:
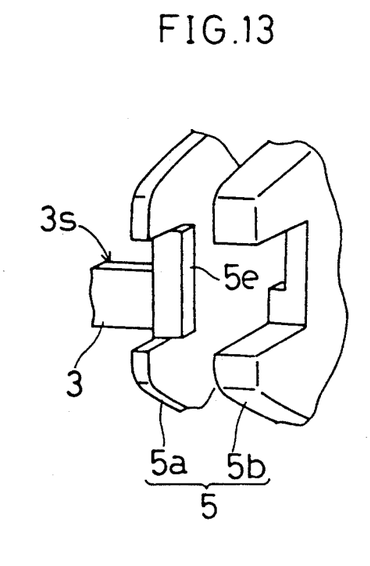
FIG. 13 is a fragmentary perspective view of the reel.

As shown in FIG. 4, the right and left side members 4 and 5 include side plates 4a and 5a and outer wall members 4b and 5b surrounding the side plates 4a and 5a, respectively. A rotary shaft 9 connected to the handle 7 extends through a space between the right side plate 5a and the outer wall member 5b.

The drag adjuster 8 is screwed to a screw portion 9a defined on an outer end portion of the rotary shaft 9. The rotary shaft 9 includes, at an inner end portion thereof, a drag mechanism B, a ratchet wheel 10, and an interlock gear 11 for rotating the level wind mechanism A.

The level wind mechanism A reciprocates a fishing line guide member 14 along a guide rod 13 by rotating a screw shaft 12. The drive from the interlock gear 11 is transmitted to a gear 15 mounted on an end portion of the screw shaft 12 through an intermediate gear 16.

The ratchet wheel 10 defines a plurality of radially projecting teeth 10a on an outer periphery thereof. A pawl member 17 is mounted in the vicinity of the ratchet wheel 10 to be urged in a direction for engaging one of the teeth 10a whereby the ratchet wheel 10 functions to lock the rotary shaft 9 against reverse rotation.

An idling disk 18, provided with an output gear 18a on an outer periphery thereof, is supported by the rotary shaft 9. The drag mechanism B includes friction plates 19 sandwiching the idling disk 18 and fitted on the rotary shaft 9. The friction force of the drag mechanism B is adjusted by turning the drag adjuster 8.

The spool 2 rotates in unison with a support shaft 20. The shaft 20 has an engaging portion 20a in an intermediate portion thereof. A slide member 21 engageable with the engaging portion 20a is freely rotatably supported by the support shaft 20. Since an input gear 21a mounted on the slide member 21 is meshed with the output gear 18a of the idling disk 18, the handle 7 is rotated, with the slide member 21 engaging the engaging portion 20a, to rotate the spool 2 and wind up the fishing line.

In this connection, the level wind mechanism A equalizes the amount of fishing line along the length of the spool 2 while the ratchet wheel 10 prevents the handle 7 from being operated in a reverse direction.

The slide member 21 combines with the engaging member 20a to form a clutch C. When attempting to throw out the fishing line, i.e., in a baitcasting operation, the slide member 21 is set to the position shown in FIG. 2 (i.e., a clutch disengaging position), the rod 1 is swung, and the fishing line is drawn out from the reel.

The setting of the spool 2 to the free rotation condition, i.e., the disengaged condition of the clutch C, is carried out by pushing the pressing knob 6 downwardly. The pressing knob 6 has a base end which embraces the right and left side plates 4a and 5a and which is pivotably supported in front of the thumb rest 3. The pressing knob 6 is pivotably supported by portions 22, which are remote from the spool 2. Such support positions are advantageous in limiting variance of the reel posture with operation of the pressing knob 6.

A ring-shaped cam 23A (with a sloped cam face) is pivotably supported coaxially with the support shaft of the spool 2 and includes an arm 23a connected to an arm 6a of the pressing knob 6 through a linkage 24.

The slide member 21 is engaged with a shifter 26 movable along shafts 25 parallel to and arranged substantially above and below the support shaft 20, respectively. An arm portion 23b of the ring-shaped cam 23 pivotably supports a swinging element 27. A toggle spring 28 is provided for switching the swinging element 27 between a posture for engaging one of the teeth 10a of the ratchet wheel 10 and a posture for disengaging from the teeth 10a. When pressed downwardly to a position beyond a dead point (DP), the pressing knob 6 automatically reaches a downward operational position under the urging force of the toggle spring 28, as a result of which the spool is set to the free rotation condition.

The pressing knob 6 of the preferred embodiment is operated by the thumb of the right hand. When the pressing knob 6 is set to a clutch engaging position (ON), an upper face 6s of the pressing knob 6 is positioned above the upper face 3s of the thumb rest 3. In contrast, when the pressing knob 6 is set to a clutch disengaging position (OFF), the upper face 6s is positioned below the upper face 3s. As seen from FIG. 3, when the clutch C is set to the disengaged position, i.e., when the spool 2 is set to the free rotation condition, the tip of the right thumb resting on the upper face 3s of the thumb rest 3 can be easily and stably placed in contact with the spool 2 (or the fishing line wound around the spool 2) with little displacement of the right thumb. In other words, thumbing can be accomplished without having to displace the thumb which operated the pressing knob 6.

To return the knob 6 to its ON position (i.e., to engage the clutch), the swinging element 27 is pushed back under the rotational force of the teeth 10a by turning the handle 7.

Numeral 29 denotes a centrifugal brake for preventing a backlash of the spool with release of the fishing line.

A second embodiment of the present invention is illustrated in FIGS. 6 to 9. The second embodiment has a clutch with substantially the same structure and function as in the first embodiment. The second embodiment has a slidably and linearly movable control member 6 held in a vertical direction between right and left side members 4 and 5 rearwardly of the thumb rest 3. The control member 6 also has an upper face 6s positioned lower than the upper face 3s of the thumb rest 3 when positioned at its lower operational position.

The control member 6 is guided along opposite sides thereof by contact portions 4c, 4d, 5c and 5d defined in the right and left side members 4 and 5, respectively. This stabilizes the control member 6 during operation.

FIGS. 10 to 13 show a third embodiment. The third emobidment has a clutch with substantially the same structure and function as in the first embodiment. In the third embodiment, the control member 6 is positioned rearwardly of the thumb rest 3 and has a large width extending outwardly of the right and left side members 4 and 5 to be slidably and linearly movable in the vertical direction. The control member 6 also has an upper face 6s positioned lower than the upper face 3s of the thumb rest 3 when positioned at its lower operational position.

The control member 6 is restrained from moving in the longitudinal and transverse directions by guide portions 4e and 5e. These portions are defined on rear edges of the right and left side plates 4a and 5a. This arrangement stabilizes the control member 6 during operation.

Figure 14:
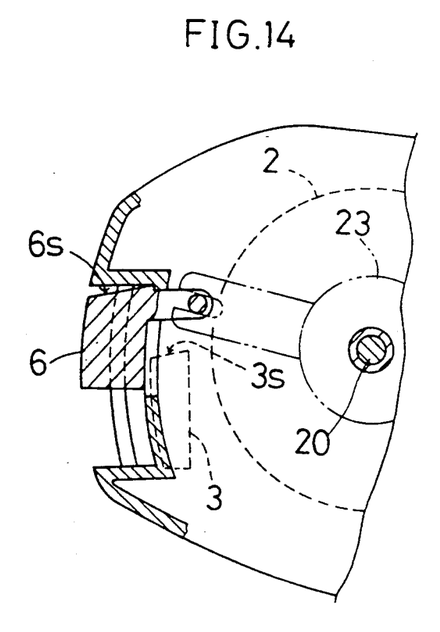
FIG. 14 is a fragmentary, cross-sectional side view of a fishing reel according to a fourth embodiment.

In a fourth embodiment illustrated in FIG. 14, the control member 6 is slidably movable along arcuate guide faces, instead of being linearly movable as in the second and third embodiments.

Figure 15:
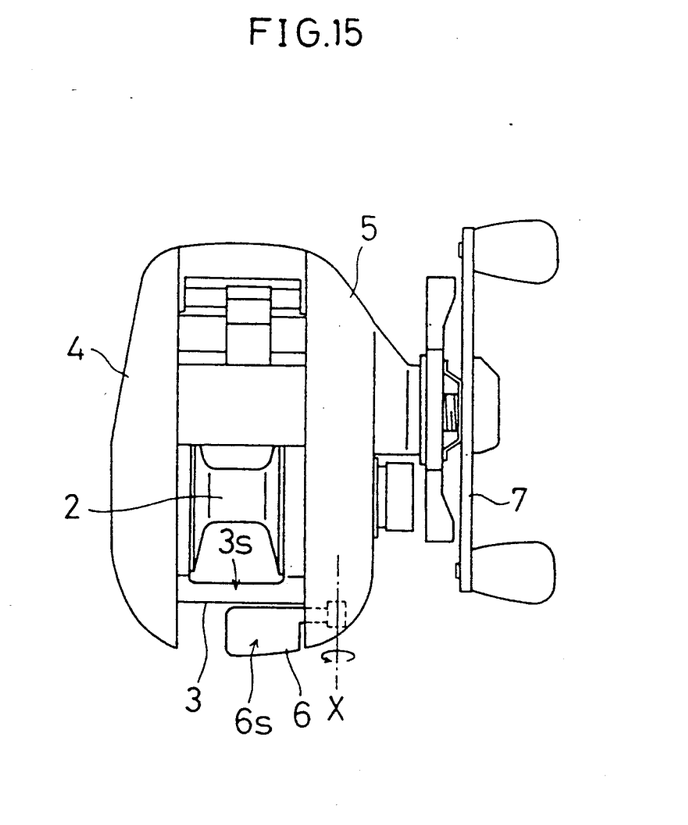
FIG. 15 is a plan view of a fishing reel according to a fifth embodiment.

A fifth embodiment of the present invention is illustrated in FIG. 15. In the fifth embodiment, the control member 6 is a lever which is pivotable about a longitudinal axis X.

The present invention is not limited to the specific embodiments shown and described. For example, the control member need not be held in place by toggles. The member may be, e.g., connected to an electrically driven reel.

What is claimed is:

1. A baitcasting reel, comprising:
   first and second side members, a front line payoff end and an opposite rear end;
   a spool shaft rotatably supported between said first and second side members, and a spool mounted on said spool shaft;
   a handle rotatably attached to one of said side members;
   transmission means for transmitting rotary force from said handle to said spool shaft, said transmission means including an engageable and disengageable clutch, wherein said spool shaft is operatively connected to said handle when said clutch is engaged, and wherein said spool shaft is rotatable with respect to said handle when said clutch is disengaged;
   a thumb rest element having a first thumb rest surface fixedly supported between said side members and behind said spool;
   clutch disengaging means for disengaging said clutch, said clutch disengaging means including a control member which is movable between upper and lower positions, wherein movement of said control member to said lower position causes said clutch to be disengaged, and wherein said control member has a second thumb rest surface positioned between said side members and behind said first thumb rest surface; and
   retaining means for retaining said control member in said lower position, said retaining means having a toggle spring mechanism that selectively urges said control member toward both said upper and lower positions; and
   wherein said second thumb rest surface is positioned above said first thumb rest surface when said control member is in said upper position, and wherein said second thumb rest surface is positioned below said first thumb rest surface when said control member is in said lower position and retained by said retaining means, and wherein said first and second thumb rest surfaces are substantially parallel to each other, and wherein said first and second thumb rest surfaces are adjacent to each other.

2. A baitcasting reel as defined in claim 1, wherein said control member is slidable between said upper and lower positions along a vertically extending path.

3. A baitcasting reel as defined in claim 2, wherein said control member is guided by a plurality of guide faces formed by said side members and said thumb rest element.

4. A baitcasting reel as defined in claim 2, wherein said control member slides substantially along a straight line.

5. A baitcasting reel as defined in claim 2, wherein said control member slides along an arc which is concave with respect to said spool.

* * * * *